United States Patent Office 3,558,651
Patented Jan. 26, 1971

3,558,651
1a-ACYL-7-ACYLOXY-9a-METHOXY-MITOSANES
Masanao Matsui, Tokyo, Keizo Uzu, Sunto-gun, Shizuoka-ken, and Shigetoshi Wakaki, Tokyo, Japan, assignors to Kyowa Hakko Kogyo Co., Ltd., Tokyo, Japan, a corporation of Japan
Continuation-in-part of application Ser. No. 470,725, July 9, 1965. This application Sept. 9, 1968, Ser. No. 758,287
Claims priority, application Japan, July 10, 1964, 39/38,919
Int. Cl. C07d 27/36
U.S. Cl. 260—326.3                4 Claims

ABSTRACT OF THE DISCLOSURE

Compounds of the formula:

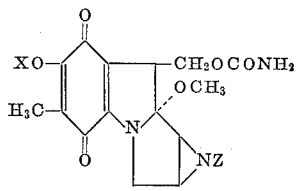

wherein X is H or R'CO, Z is H or R'CO and R' is lower alkyl or monocyclic carbocyclic aryl. These compounds are produced by a hydrolysis reaction in alkaline solution.

---

This application is a continuation-in-part of copending application Ser. No. 470,725, filed on July 9, 1965, and now abandoned.

The present invention relates to new antibiotics, more particularly, to new derivatives of mitosane compounds.

In 1956, Hata et al. isolated new antibiotics from the fermented broth of *Streptomyces caespitosus* and named the antibiotics mitomycin A and B. In 1958, Wakaki et al. isolated a third antibiotic from the same broth and named it mitomycin C. Since then it has been determined that the chemical composition of the three compounds is as follows:

Mitomycin A

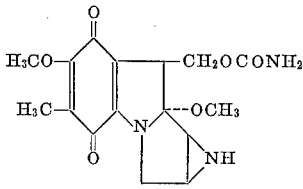

Mitomycin B

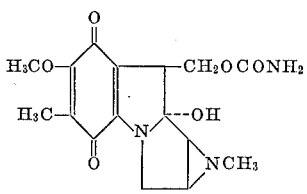

Mitomycin C

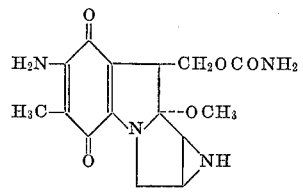

Generically these compounds correspond to the formula

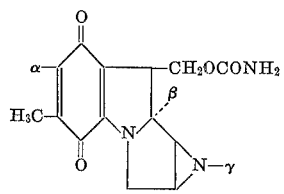

wherein

|   | A | B | C |
|---|---|---|---|
| α is | $OCH_3$ | $OCH_3$ | $NH_2$ |
| β is | $OCH_3$ | $OH$ | $OCH_3$ |
| γ is | $H$ | $CH_3$ | $H$ |

These compounds thus have the following skeleton:

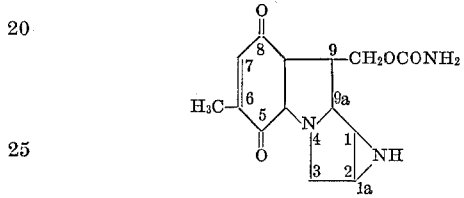

and are called mitosane compounds.

Mitomycin A, B and C are excellent antibiotics, but they have a defect in that they are toxic to human blood. In order to obtain less toxic mitosane compounds, some research has been conducted even before the determination of the chemical composition of mitomycin A, B and C; for example, monomethyl-mitomycin C or porfiromycin was synthesized by reacting mitomycin C and methyl iodide in the presence of potassium carbonate. After the determination of the chemical composition of mitomycin A, B and C, research to obtain derivatives has been actively conducted. For example, Belgian Pat. 624,-559 provides some 6, 7 and 1a-substituted derivatives of mitosane compounds.

The present invention is concerned with novel mitosane derivatives of reduced toxicity and of correspondingly enhanced utility as antibiotics, and to the preparation thereof. The invention will become apparent to those skilled in the art from a consideration of the following specification and claims and of the attached drawings, wherein:

Figure 1:
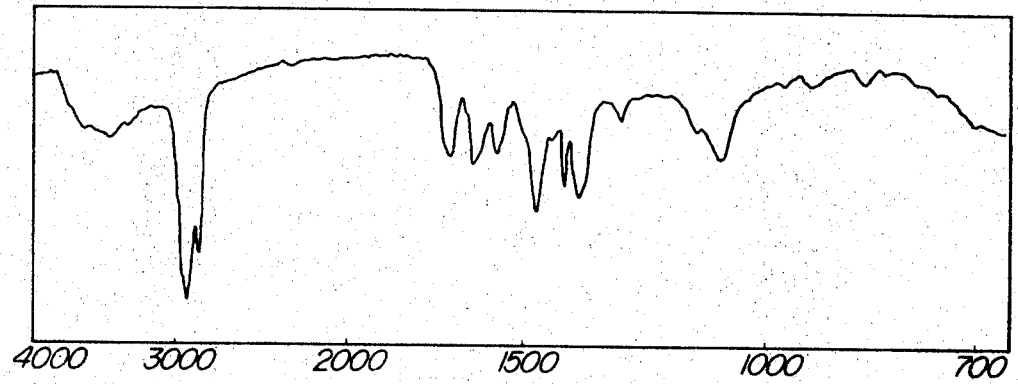
FIG. 1 is the infra-red spectrum of the sodium salt of 7-hydroxy-9a-methoxy-mitosane.

The new antibiotics of the present invention are derivatives of the formula.

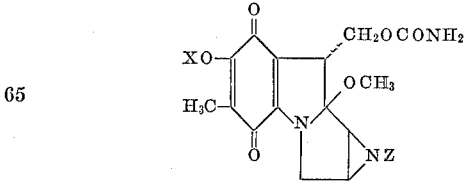

wherein each of X and Z stands for H, R or RCO—, R being a substituted or unsubstituted aliphatic hydrocarbon or aromatic hydrocarbon radical, such as a lower alkyl group, e.g., methyl, or the phenyl radical or halophenyl or lower alkylphenyl, and which are synthesized from mitomycin A and C and derivatives thereof.

(1) Compounds (I) wherein X is H are prepared as follows:

Mitomycin A or C or a suitable derivative thereof is dissolved in an aqueous alkaline solution and the resultant solution allowed to stand for some time, after which the 7-positioned-methoxy or amino group is replaced by an —OH group, according to the following reaction scheme:

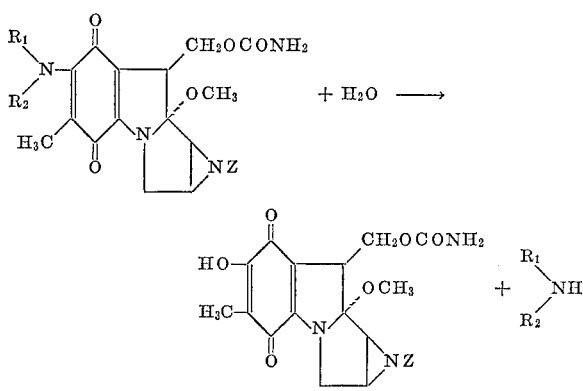

$R_1$ and $R_2$ each representing H or a hydrocarbon radical.

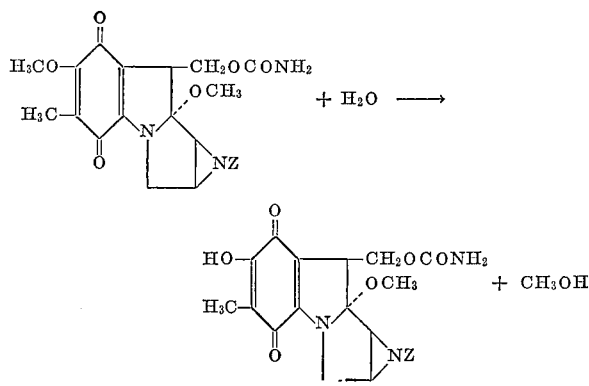

These hydrolysis reactions are carried out only in alkaline solution, i.e., in an aqueous solution of an inorganic base such as sodium carbonate, sodium hydroxide or potassium hydroxide or in an organic base such as triethylamine.

In order to realize a favorable yield, it is advisable first to dissolve the starting compound in aqueous 0.1 N NaOH solution and to allow the solution mixture to stand at 25° to 30° C. for 30 or 40 hours in the case of mitomycin C or its derivatives, or for 2 to 3 hours in the case of mitomycin A or its derivatives.

(2) Compounds (I) wherein X is R are prepared as follows:

7-hydroxy-9a-methoxy-mitosane obtained according to the procedure of the preceding paragraph is reacted with an alkylating agent such as diazoalkane, an alkyl halide, a dialkyl sulfate, etc. The corresponding 7-lower alkoxy-9a-methoxy-mitosane or derivative thereof is thus obtained, according to the following reaction scheme.

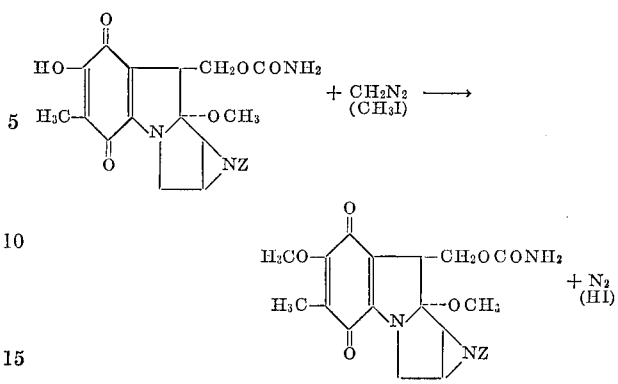

wherein Z stands for H, a hydrocarbon radical or an acyl group (RCO—). The resultant 7-methoxy-9a-methoxy-mitosane or 1a-substituted derivative thereof corresponds to mitomycin A or to the 1a-substituted derivative thereof, respectively, the physical and chemical properties and the infra-red spectra being precisely the same in the two cases. When acid is produced as a by-product in this reaction, e.g., when an alkyl halide or a dialkyl sulfate is used as the alkylating agent, a neutralizing agent such as an inorganic alkali or an organic base must be present to prevent decomposition of the product.

(3) Compounds (I) wherein X is RCO— are prepared as follows:

7-hydroxy-9a-methoxy-mitosane or a 1a-substituted derivative thereof is reacted with an acid anhydride or an acid halide, yielding the corresponding 7-acyloxy derivatives according to the following scheme:

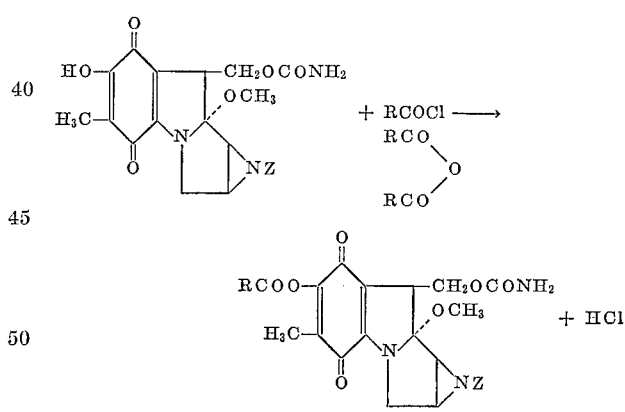

When Z is H, the reaction proceeds as follows:

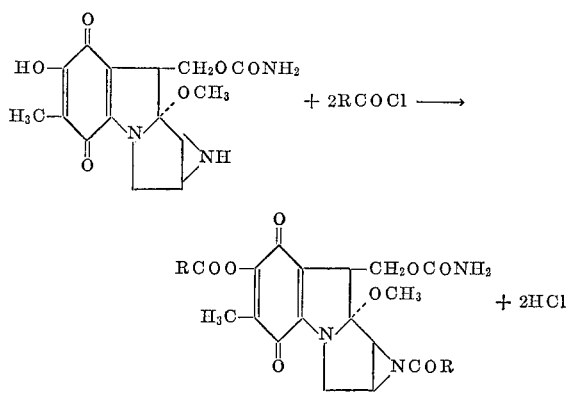

and a diacyl derivative is obtained.

In this acylating reaction also, a neutralizing agent such as an organic base or an inorganic alkali should be present to bind the liberated acid. The acid anhydrides of acid halides employed are aliphatic and aromatic carboxylic anhydrides and halides.

The following examples are given merely as illustrative of the present invention and are not to be considered as limiting. Unless otherwise noted, the percentages therein and throughout the application are by weight per liter of water.

EXAMPLE I

7-hydroxy-9a-methoxy-mitosane 800 mg. (milligrams) of mitomycin C is dissolved in 6 ml. (milliliters) of 0.1 N NaOH solution of 50% methanol, and allowed to stand for 2 days at room temperature (20 to 30° C.). Excess Dry Ice is added to the reaction mixture to neutralize NaOH. The reaction mixture is concentrated under reduced pressure at below 40° C. and dried; a mixture of the Na-salt of 7-hydroxy-9a-methoxy-mitosane and $NaHCO_3$ is obtained. Adding a small amount of methanol, only the Na-salt of 7-hydroxy-9a-methoxy-mitosane is extracted. The extract solution is concentrated under reduced pressure and dried. The resulting material is dissolved in a small amount of methanol and filtered, after which ether is added to produce precipitation. The precipitate is separated to give 730 mg. of an amorphous powder having a blue color. This is the Na-salt of 7-hydroxy-9a-methoxy-mitosane, the infrared spectrum of which is shown in FIG. 1. The said Na-salt is dissolved in methanol and treated with silica-gel which is pretreated with acid. The reddish-purple effluent is concentrated under reduced pressure and dissolved in a small amount of methanol, followed by the addition of ether. The resulting precipitate is separated and dried to give 580 mg. of an amorphous reddish-purple powder of 7-hydroxy-9a-methoxy-mitosane.

*Analysis.*—Calcd. for $C_{15}H_{17}O_6N_3$ (percent): C, 53.73; H, 5.11; N, 12.53. Found (percent): C, 53.40; H, 5.02; N, 12.34.

Figure 2:
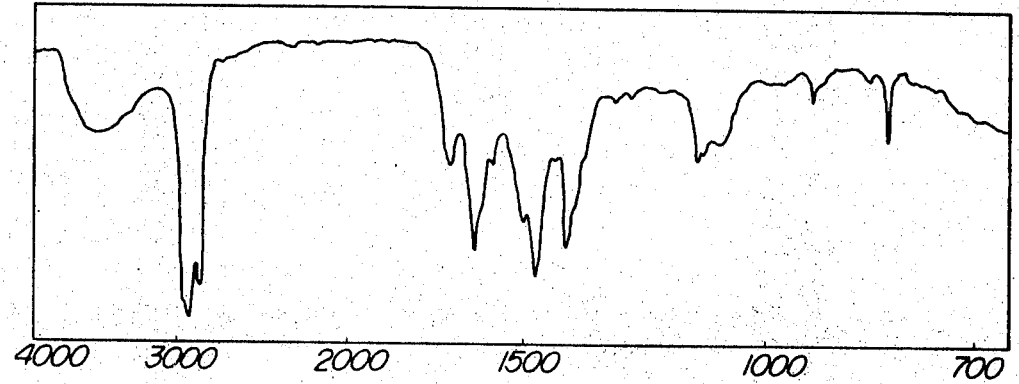
FIG. 2 is the infra-red spectrum of 7-hydroxy-9a-methoxy-mitosane.

The infra-red spectrum in Nujol is shown in FIG. 2, the $\lambda_{Max.}^{MeOH}$ being 216 and 360 m$\mu$.

EXAMPLE II

7-hydroxy-9a-methoxy-mitosane from Mitomycin A 500 mg. of mitomycin A is treated as described in Example I except that the reaction time is 3 hours. 420 mg. of 7-hydroxy-9a-methoxy-mitosane is produced.

EXAMPLE III

7-methoxy-9a-methoxy-mitosane 500 mg. of 7-hydroxy-9a-methoxy-mitosane is dissolved in 100 ml. of ethyl acetate and, after the addition to excess diazomethane in ether, is allowed to stand for 30 minutes at room temperature. The reaction mixture is concentrated under reduced pressure and dried to give a reddish-purple residue. The residue is dissolved in 50 ml. of ethyl acetate and passed through a silica-gel column and then developed and eluted with ethyl acetate. The main reddish-purple fraction is concentrated under reduced pressure and dried. The product is crystallized from ether. 340 mg. of reddish-purple needle crystals, i.e., 7-methoxy-9a-methoxy-mitosane, is obtained. The melting point of the product is 160° C.

*Analysis.*—Calcd. for $C_{16}H_{14}O_6N_3$ (percent): C, 55.01; H, 5.48; N, 12.03. Found (percent): C, 54.71; H, 5.45; N, 11.72.

Figure 3:
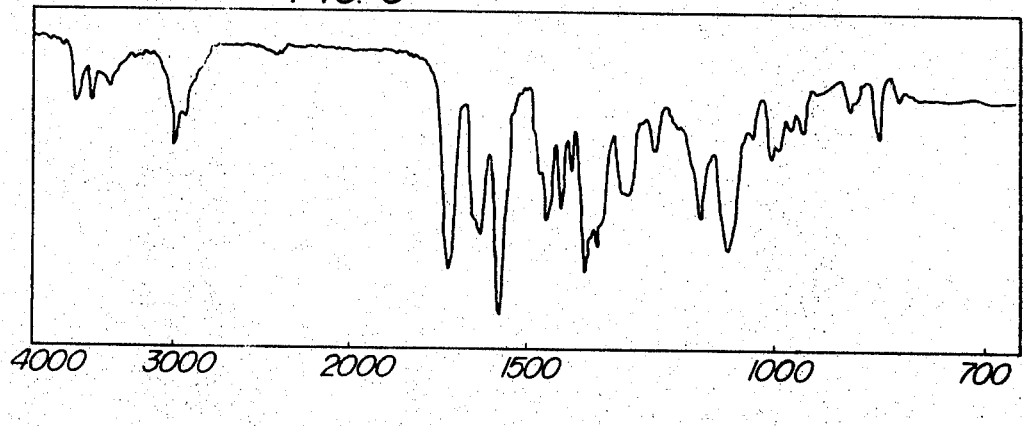
FIG. 3 is the infrad-red spectrum of 7-methoxy-9a-methoxy-mitosane.

The infra-red spectrum in chloroform is shown in FIG. 3 which is in concordance with that of mitomycin A.

EXAMPLE IV

7-methoxy-9a-methoxy-mitosane 400 mg. of 7-hydroxy-9a-methoxy-mitosane is dissolved in 30 ml. of acetone, after which 500 mg. of anhydrous potassium carbonate is added. 1 ml. of methyl iodide is added to the solution, which is then refluxed for 30 minutes with stirring. The reaction mixture is filtered and the filtrate is concentrated under reduced pressure. The resulting residue is dissolved in ethyl acetate and treated with silica-gel as in Example III. 230 mg. of reddish-purple crystals of 7-methoxy-9a-methoxy-mitosane is obtained. The melting point of the product is 158° C.

The infra-red spectrum is in agreement with that obtained in Example III.

EXAMPLE V

1a-acetyl-7-acetoxy-9a-methoxy-mitosane 500 mg. of 7-hydroxy-9a-methoxy-mitosane is dissolved in 10 ml. of pyridine and, after adding 5 ml. of acetic anhydride, allowed to stand for 20 minutes at room temperature. The reaction mixture is concentrated in vacuo and the resulting residue is dissolved in 20 ml. of ethyl acetate. The solution is passed through a silica-gel column and developed and eluted with ethyl acetate. The main reddish fraction is concentrated in vacuo and dissolved in a small amount of ethyl acetate, ether being added to cause crystallization. 370 mg. of reddish-purple needle crystals of 1a-acetyl-7-acetoxy-9a-methoxy-mitosane is obtained.

*Analysis.*—Calcd. for $C_{19}H_{21}O_8N_3$ (percent): C, 54.41; H, 5.05; N, 10.02. Found (percent): C, 53.90; H, 5.10; N, 9.95.

Figure 4:
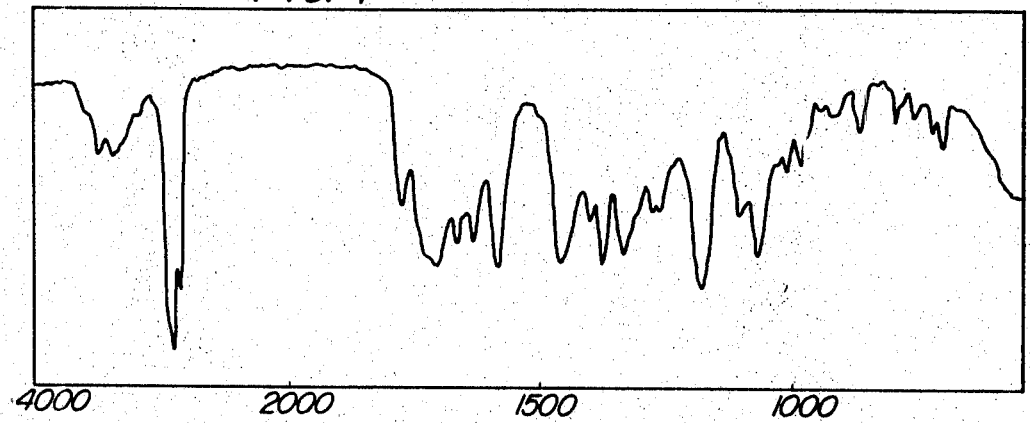
FIG. 4 is the infra-red spectrum of 1a-acetyl-7-acetoxy-9a-methoxy-mitosane.

The infra-red spectrum in Nujol is shown in FIG. 4.

EXAMPLE VI

1a-benzoyl-7-benzoyloxy-9a-methoxy-mitosane 1 g. of 1a-hydroxy-9a-methoxy-mitosane is dissolved in 10 ml. of pyridine and 0.5 ml. of benzoyl chloride added thereto. After standing for 20 minutes at room temperature, the reaction mixture is poured into 100 ml. of ice water and extracted twice with ethyl acetate. The extracted solution is extracted twice with 50 ml. of 10% $NaHCO_3$ solution in order to remove acid. The remaining ethyl acetate solution is concentrated in vacuo and dissolved in ethyl acetate and poured into a silica-gel column. Development and elution are carried out using ethyl acetate. The reddish-purple fraction is concentrated, ether being added to cause precipitation of the 1a-benzoyl-7-benzoyloxy-9a-methoxy-mitosane.

*Analysis.*—Calcd. for $C_{29}H_{25}O_8N_3$ (percent): C, 64.08; H, 4.64; N, 7.73. Found (percent): C, 63.85; H, 4.58; N, 7.50.

Figure 5:
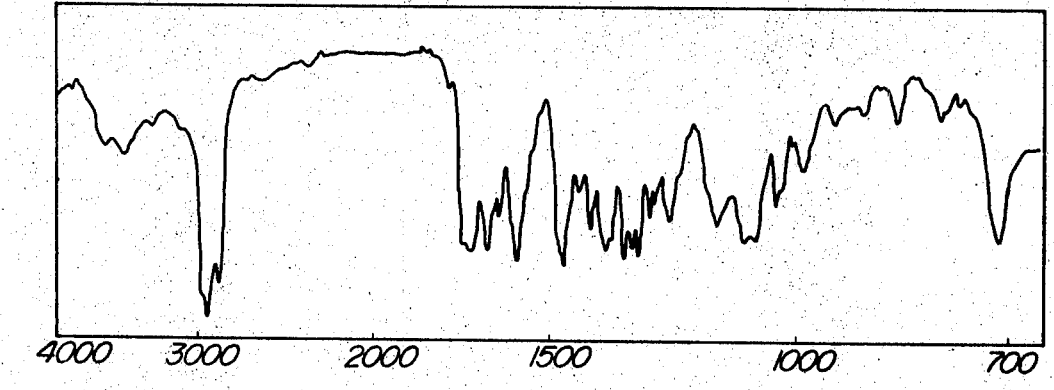
FIG. 5 is the infra-red spectrum of 1a-benzoyl-7-benzoyloxy-9a-methoxy-mitosane.

The infra-red spectrum in Nujol is shown in FIG. 5.

The antibiotics obtained in accordance with the present invention are useful as antibacterial agents since they have a strong broad-spectrum antibacterial activity. The antibacterial spectrum of 7-hydroxy-9a-methoxy-mitosane, representing the amount necessary to inhibit the growth of various typical bacteria, is shown in Table 1. The results were obtained in a standard manner, using the agar-dilution streak-plate technique which is commonly used in testing new antibiotics. The minimum inhibition concentrations shown are expressed in micrograms per milliliter. For comparison purposes, the antibacterial spectrum of mitomycin A as given in the Meyer et al. patent, U.S. 3,226,393, and as found by the applicants, is also recited in Table 1.

TABLE 1

| Microorganism tested | Minimum inhibition concentration (MIC) (mcg./ml.) | | |
|---|---|---|---|
| | 7-hydroxy-9a-methoxy-mitosane, mcg./ml. | Mitomycin A [7-methoxy-9a-methoxy-mitosane] | |
| | | U.S. 3,226,393 | Applicants' results |
| *Staphylococcus aureus* 209 P | 12.5 | 0.2 | 0.4 |
| *Sarcina lutea* PCI 1001 | 6.25 | 0.05 | 0.03 |
| *Bacillus subtilis* ATCC 6633 | 12.5 | 0.2 | 0.1 |
| *Salmonella typhi* 379 | 1.56 | | |
| *Shigella flexneri* Za 3196 | 1.56 | | |
| *Klebsiella pneumoniae* 0/10 | 3.12 | 1.5 | |
| *Proteus* X19 | 25 | 0.4 | |
| *Escherichia coli* K-12 | 3.12 | 1.5 | 1.0 |
| *Pseudomonas aeruginosa* 35 | 50 | | |
| *Vibrio comma* 62 | 50 | | |
| *Mycobacterium tuberculosis* 607 | 6.25 | | |
| *Streptococcus haemolyticus* 68 | 3.12 | 0.025 | |
| *Streptococcus faecalis* 5 | 3.12 | 3.1 | |
| *Diplococcus pneumoniae* 1–19 | 0.39 | | |
| *Corynebacterium diphtheriae* 92 | 0.19 | | |

The therapeutic index [=$LD_{50}$ (mg./kg.)/MIC(mcg./ml.)] of 7-hydroxy-9a-methoxy-mitosane is surprisingly better than that of mitomycin A, as can be seen from Table 2:

TABLE 2

| Microorganism tested | Therapeutic index | |
|---|---|---|
| | Mitomycin A, Meyer et al., U.S. 3,226,393 | 7-hydroxy-9a-methoxy-mitosane |
| *Staphylococcus aureus* | 10 | 12 |
| *Sarcina lutea* | 40 | 24 |
| *Bacillus subtilis* | 10 | 12 |
| *Klebsiella pneumoniae* | 1.33 | 48.7 |
| *Proteus* X19 | 5 | 6 |
| *Escherichia coli* | 1.33 | 48.7 |
| *Streptococcus hemolyticus* | 80 | 48.7 |
| *Streptococcus faecalis* | 0.645 | 48.7 |

In addition, the $LD_{50}$ to the mouse of 7-hydroxy-9a-methoxy-mitosane is 150 mg./kg. while that of mitocycin A is 2 mg./kg.

What is claimed is:
1. 1a-lower alkanoyl-7-lower alkanoyloxy-9a-methoxy-mitosane.
2. 1a-acetyl-7-acetoxy-9a-methoxy-mitosane.
3. 1a-phenylcarbonyl - 7 - phenylcarbonyloxy-9a-methoxy-mitosane.
4. 1a-benzoyl-7-benzoyloxy-9a-methoxy-mitosane.

References Cited

UNITED STATES PATENTS 3,226,393    12/1965    Meyer et al. _____ 260—295

OTHER REFERENCES

Webb et al.: J. Am. Chem. Soc. 84-3185–87 (1962).
Wagner et al.: Synthetic Organic Chemistry (1953), p. 172.

ALEX MAZEL, Primary Examiner

J. A. NARCAVAGE, Assistant Examiner

U.S. Cl. X.R.

424—274